Dec. 22, 1925.
E. W. SEAHOLM
1,566,434
BRAKE MECHANISM FOR MOTOR VEHICLES
Filed May 26, 1920
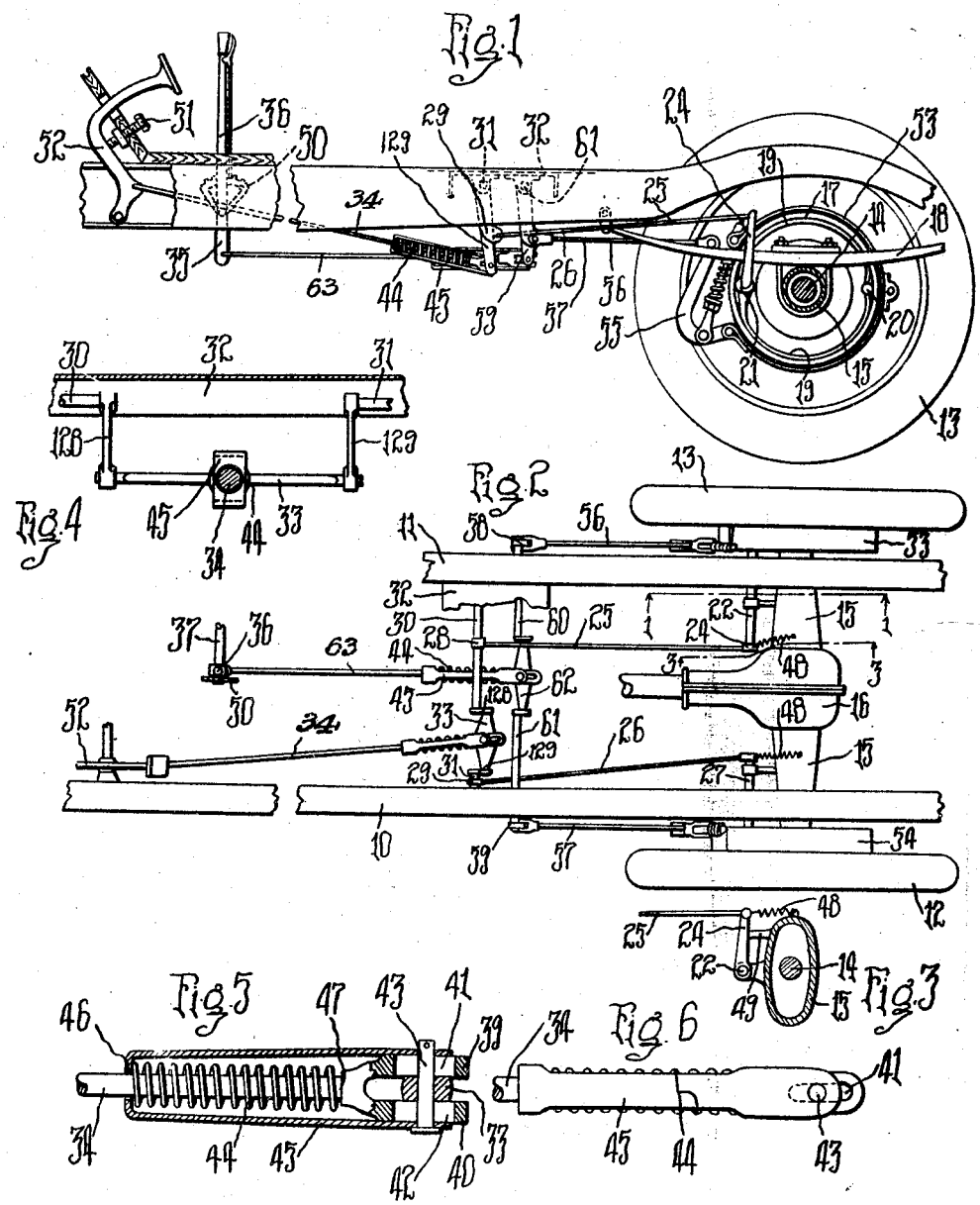
Inventor
Ernest W. Seaholm
By Attorneys
Blackmore, Spencer & Flint Patented Dec. 22, 1925.

1,566,434

UNITED STATES PATENT OFFICE.

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE.

BRAKE MECHANISM FOR MOTOR VEHICLES.

Application filed May 26, 1920. Serial No. 384,363.

*To all whom it may concern:*

Be it known that I, ERNEST W. SEAHOLM, a citizen of the United States, and a resident of Detroit, county of Wayne, and State of Michigan, have invented certain new and useful Improvements in Brake Mechanism for Motor Vehicles, of which the following is a full, clear, concise, and exact description, such as will enable others skilled in the art to which the invention relates to make and use the same, reference being made therein to the accompanying drawings, which form a part of this specification.

My invention relates to brake mechanism designed for use in connection with automobiles, motor trucks and similar self-propelled vehicles; and particularly to brake mechanism wherein suitable retarding elements such, for example, as brake shoes, a brake band or equivalent element, are forced into engagement with rotating brake drums to thereby retard the movement of the vehicle.

The principal object of my invention is to provide improved brake mechanism of the general type or class above referred to and wherein the mechanism through which the retarding members such, for example, as brake bands, brake shoes, or equivalent elements are forced into engagement with the brake drums includes a spring which acts to take up lost motion in the brake applying mechanism as a whole, to thereby prevent movement of the parts relative to one another when the brakes are off and noise incident to looseness at the joints or connections between the various elements of the brake applying mechanism.

A further object of my invention is to provide brake mechanism of the type or class above referred to and wherein vertical movement of the rear axle of the vehicle permitted by the springs thereof and due to roughness of the roadway will not communicate oscillatory motion to the foot pedal or brake applying lever whereby the brakes are applied; such end being accomplished by the use of yieldable spring mechanism included in the brake applying mechanism and forming a part thereof, and which spring mechanism serves to compensate for the upward and downward movement of the vehicle axle and prevent movement of the brake applying lever such as would otherwise occur.

With the above and other objects of invention in view, my invention consists in the improved brake applying mechanism illustrated in the accompanying drawing and hereinafter described and claimed; and in such variations and modifications thereof, within the scope of the concluding claims, as will be obvious to those skilled in the art to which my invention relates.

Referring now to the drawing wherein the preferred embodiment of my invention is illustrated:

Figure 1 is a fragmentary view showing the rear portion of a motor propelled vehicle, the view being for the most part in side elevation; altho the axle is upon a section indicated by the line 1, 1, Figure 2, the far or right hand rear wheel and the brake mechanism therefor being shown.

Figure 2 is a similar view showing a motor vehicle frame and running gear in plan and equipped with brake mechanism in accordance with my invention.

Figure 3 is a view showing a section upon a vertical plane indicated by the line 3, 3, Figure 2.

Figure 4 is a fragmentary view showing an equalizing bar of the brake mechanism upon a larger scale.

Figures 5 and 6 are views showing yieldable spring mechanism included in and forming a part of the brake applying mechanism in section and in plan.

In the drawings, the reference numerals 10, 11 designate the two side members of the frame of a motor vehicle, and 12, 13 the rear driving wheels thereof; said driving wheels being driven through two driving axles, one of which is designated by the reference numeral 14, located within a rear axle housing 15 having a centrally disposed gear casing 16 containing the usual differential gearing through which the said axles are driven.

The driving wheels of the vehicle are provided each with a brake drum, the drum secured to the wheel upon the far or right hand side of the vehicle being shown in Figure 1 and designated by the reference numeral 17; and the frame of the vehicle is supported from the axle housing 15 through suitable springs, one of which is designated by the reference numeral 18 in said figure.

Located within the brake drums are internal brake shoes 19, 19, Figure 1, said shoes being adapted to contact with the interior of the drum and the same being prevented from rotating with the drum by a fixed abutment 20 supported from the axle housing 15, as is usual in brake mechanism. These brake shoes are forced apart from one another and into frictional engagement with the interior of the drum by a cam 21 secured to the outer end of an oscillating shaft 22 which is supported in bearings carried by the rear axle housing and by a supporting disc carried by the rear axle housing and located adjacent the open inner end of the drum, and which disc serves also as a support for the fixed abutment 20, this being a construction common in brake mechanism.

Extending upward from the inner end of the shaft 22 is an arm 24 through which oscillatory movement is imparted to the said shaft, and a brake applying rod 25 is pivotally connected with the upper end of this arm. The reference numeral 26 designates a second brake applying rod similar in all respects to the rod 25 and the rear end of which is likewise pivotally connected with an arm carried by a second oscillating shaft 27 supported from the rear axle housing in the same manner as the shaft 22, and which shaft acts in the same manner as above explained in referring to the brake shoes for the right hand wheel to force brake shoes located within the brake drum carried by the left-hand wheel 12 into engagement with the interior thereof, the brake mechanism being identical as regards the two wheels of the vehicle as will be appreciated.

The forward ends of the brake applying rods 25, 26 are pivotally connected with the lower ends of arms 28, 29 depending from shafts 30, 31 which are supported in suitable bearings carried by a transversely extending frame member 32 extending between the side frame members, 10, 11; and the reference numeral 33 designates an equalizing bar extending between the lower ends of other arms 128, 129 also carried by the shafts 30, 31 and through which bar both said arms are operated and angular movement imparted to said shafts as said equalizing bar is moved, and which equalizing bar secures the application of the brake shoes with equal force to the two brake drums as will be understood.

Extending forward from the equalizing lever is an operating rod designated by the reference numeral 34 the forward end of which is pivotally connected with a brake applying pedal 52, although the character of the said brake applying member and the manner in which it is operated are immaterial and may be varied without departing from my invention. The rear end of the rod 34 is bifurcated to thereby provide arms 39, 40, and the arms thus formed are provided with elongated slots 41, 42 in which a pin 43 which extends through the equalizing bar 33 and through which motion is communicated to said bar extends; so that the said operating rod moves slightly toward the left when the brakes are applied before the walls at the rear or right hand ends of the slots 41, 42 come into engagement with the pin 43 and transmit motion to the equalizing bar and the brakes, the construction in question thus forming a lost motion connection or device through which motion is communicated to the braking elements when the brakes are applied.

Surrounding the operating rod 34 is a coil spring 44; while the reference numeral 45 designates a yoke or shackle through the free ends of which the pin 43 extends, and the forward end of which is provided with an opening at 46 through which the operating rod 34 extends, the spring 44 being held under initial compression to a greater or less extent between the left hand end of the shackle and a ledge at 47 provided adjacent the bifurcated rear end of the said operating rod; whereby yieldable spring mechanism is provided between the operating rod 34 and the equalizing bar and brake applying mechanism operated thereby.

The portion of the brake applying mechanism adjacent the rear axle housing is provided with means for yieldably holding the entire operating mechanism in the position which it assumes when the brakes are off, such end being attained in the form of my invention illustrated by springs 48 the rear ends of which are secured to fixed abutments carried by the rear axle housing, while the forward ends of said springs are operatively connected with the levers 24; and which springs obviously act to hold the brake applying rods 25, 26 in the rearward position which they assume when the brakes are off; such a spring being associated with the brake mechanism of each wheel as will be appreciated and the same serving to hold the levers 24 in contact with stops 49 which limit the rearward movement thereof.

It will be appreciated that the springs 18 permit vertical movement of the rear axle housing 15 relative to the frame of the vehicle, which movement is accompanied by a fore and aft movement of the rear axle housing because of the fact that during such movement the rear axle and housing move in an arc the radius of which corresponds with half the length of the springs, or with the length of the torque tube of the vehicle if a torque tube is employed and the springs are supported at both their ends from the frames by swinging shackles; which vertical and fore and aft movement will communicate oscillatory movement to the levers 28, 29, and from said levers to the shafts 30, 31; and, if not compensated for, through the arms 128, 129 and bar 33 to the rod 34 and to the lever or pedal whereby the brakes are applied. In my invention, however, such movement of the rear axle housing is compensated for by the yieldable spring mechanism above referred to; as it will be appreciated that rearward movement of the lower ends of the levers 28, 29 in question will move the equalizing bar 33 to the right and compress the spring 44 by force communicated thereto through the yoke or shackle 45 without, however, moving the operating rod 34 rearward; the off position of the brake applying lever 36 being limited by a suitable stop 51 as is usual in brake mechanism. It therefore follows that upward and downward movement of the rear axle housing will be compensated for by the spring 44 and the mechanisms associated therewith, thus avoiding the transmission of oscillatory movement to the brake applying lever as would be the case if no yieldable connection were provided in the brake applying mechanism.

It will also be appreciated that the spring 44 tends always to move the operating rod 34 to the right, and the brake applying rods 25, 26 to the left, the spring in question therefore acting to draw the parts of the brake applying mechanism toward one another and to take up lost motion in all the joints between the several parts; the brake applying lever 52 resting against the stop 51 when in its off position and which stop together with the stops 49 provide abutments against which the spring acts.

The pin 43 when the parts are properly adjusted and the brakes are off lies about the middle of the slots 41, 42, as shown in Figure 5. When, however, the brakes are to be applied the brake operating lever 52 is pushed to the left and the spring 44 is compressed during the initial movement of the brake operating rod 34 to the left, and until the walls at the ends of the slots 41, 42 engage the pin 43; after which further movement of the rod 34 toward the left will act to move the rods 25, 26 in the same direction through the equalizing bar 33, thus forcing the brake shoes into engagement with the inner surface of the brake drums as will be appreciated.

It will be appreciated that the brake operating mechanism above described in detail is the mechanism associated with the interior brakes which co-operate with the insides of the drums 17. Ordinarily in motor vehicles both external and internal brakes are provided for each brake drum, and the reference numerals 53, 54 show such brake bands. These brake bands are forced into frictional engagement with the outer surface of the brake drums by means of levers 55 of a form in common use in brake mechanism of the class described, the upper ends of said levers being pivotally connected with two brake applying rods 56, 57 the forward ends of which are pivotally connected with depending arms 58, 59 carried by shafts 60, 61 which are also supported by the cross-bar 32. Oscillatory motion is communicated to the shafts 60, 61 through an equalizing bar 62 connected with the lower ends of arms depending from said shafts the same as in the mechanism hereinbefore described at length; and the reference numeral 63 designates an operating rod for the external brakes the rear end of which is connected with the equalizing bar 62 through yieldable spring mechanism of the same form, construction and operation as the similar mechanism above described in detail; the external brakes being applied by means of a lever 36 carried by a cross shaft 37 and co-operating with a segment 50, and to the lower end 35 of which the forward end of the operating rod 63 is connected.

Having thus described and explained my invention, I claim and desire to secure by Letters Patent:

1. Brake mechanism of the class described comprising retarding members adapted to be moved into frictional engagement with rotating brake drums; brake applying mechanism whereby said members are operated; an operating rod one end of which is connected with a brake applying lever, and the other end of which is connected with said brake applying mechanism through a lost motion connection which permits a limited movement of said operating rod before movement is communicated from the same to said brake applying mechanism; equalizing mechanism included in and forming a part of said brake applying mechanism and to which said operating rod is connected; a spring associated with said operating rod and through which movement is transmitted from said rod to said brake applying mechanism and which spring is normally under compression; and non-yielding connecting means intermediate said operating rod and said brake applying mechanism and through which movement is transmitted from said rod to said brake applying mechanism.

2. Brake mechanism of the class described comprising a retarding member adapted to be moved into frictional engagement with a rotating brake drum; brake applying mechanism whereby said member is operated to apply the brake; an operating rod one end of which is connected with a brake applying lever, and the other end of which is connected with said brake applying mechanism through a lost motion device which permits a limited movement of said operating rod before movement is communicated from the same to said brake applying mechanism; a yoke one end of which is operatively connected with said brake applying mechanism, and the other end of which is provided with an opening through which said operating rod extends; a coil spring surrounding said operating rod and located within said yoke, and the ends of which abut against said yoke and against an abutment carried by said operating rod; and co-operating stops carried one by said operating rod and the other by said brake applying mechanism and which stops engage one another during the further movement of said operating rod.

3. Brake mechanism of the class described comprising a brake applying lever; an operating rod the forward end of which is connected with said lever, and the rear end of which is slotted; brake applying mechanism; a pin extending through an element of said brake applying mechanism and through the slotted rear end of said operating rod; a yoke member having an opening through which said operating rod extends; and the ends of which yoke member are provided with holes through which said pin extends; a spring located within said yoke and the ends of which abut against the end thereof adjacent said opening and against an abutment provided upon said operating rod; and a retarding member operated by said brake applying mechanism and adapted to co-operate with a brake drum.

4. Brake mechanism of the class described comprising a retarding member adapted to be moved into frictional engagement with a rotating brake drum; brake applying mechanism whereby said member is moved as aforesaid; an operating rod one end of which is connected with a brake applying lever; a spring adjacent the other end of said operating rod and through which movement is communicated to said brake applying mechanism during the initial movement of said operating rod; and co-operating stops one carried by said operating rod and the other by said brake applying mechanism and which stops engage one another during a further movement of said operating rod.

5. In brake mechanism of the class described and in combination with an axle movable relative to the frame of a vehicle, and a retarding member adapted to be moved into frictional engagement with a rotating brake drum associated with a wheel carried by said axle; brake applying mechanism whereby said member is operated; an operating rod, one end of which is connected with a brake applying lever, and the other end of which is connected with said brake applying mechanism; a stop determining the position of said brake applying lever when said retarding member is in its off position; compensating mechanism including a spring through which movement of said brake applying lever is communicated to said brake applying mechanism; and cooperating stops adapted to engage one another and to communicate motion positively from said brake applying lever to said brake applying mechanism.

6. In brake mechanism of the class described and in combination with an axle movable relative to the frame of a vehicle, and a retarding member adapted to be moved into frictional engagement with a rotating brake drum carried by a wheel associated with said axle; a stop for limiting the off position of said retarding member; a brake applying lever; a stop for limiting the position assumed by said brake applying lever when said retarding member is in its off position; operating mechanism intermediate said brake applying lever and said retarding member, and through which said retarding member may be applied to said brake drum; compensating mechanism included in said operating mechanism, and which compensating mechanism includes a spring adapted to permit movement of the axle as aforesaid without straining said operating mechanism; and stops included in said operating mechanism and through which movement is communicated positively to said retarding member when said brake applying lever is operated.

In testimony whereof I affix my signature.

ERNEST W. SEAHOLM.